United States Patent [19]
Watanabe et al.

[11] Patent Number: 5,204,577
[45] Date of Patent: Apr. 20, 1993

[54] ULTRASONIC MOTOR IMPROVED IN DRIVING EFFICIENCY

[75] Inventors: Tsuneo Watanabe; Tadao Takagi, both of Yokohama; Daisuke Saya, Urayasu, all of Japan

[73] Assignee: Nikon Corporation, Tokyo, Japan

[21] Appl. No.: 888,289

[22] Filed: May 26, 1992

Related U.S. Application Data

[63] Continuation of Ser. No. 515,714, Apr. 27, 1990, abandoned.

[30] Foreign Application Priority Data

May 15, 1989 [JP] Japan .................................. 1-120685
Mar. 13, 1990 [JP] Japan .................................. 2-61769

[51] Int. Cl.$^5$ ............................................ H01L 41/08
[52] U.S. Cl. ....................................................... 310/323
[58] Field of Search ................................. 310/323, 328

[56] References Cited

U.S. PATENT DOCUMENTS

| | | | |
|---|---|---|---|
| 4,495,432 | 1/1985 | Katsuma et al. | 310/328 |
| 4,587,452 | 5/1986 | Okumura et al. | 310/323 X |
| 4,692,650 | 9/1987 | Okumura et al. | 310/323 |
| 4,743,788 | 5/1988 | Takagi et al. | 310/316 |
| 4,752,711 | 6/1988 | Tsukimoto et al. | 310/328 X |

FOREIGN PATENT DOCUMENTS

| | | | |
|---|---|---|---|
| 0178988 | 10/1984 | Japan | 310/323 |
| 0022479 | 2/1985 | Japan | 310/323 |
| 0224883 | 10/1986 | Japan | 310/323 |
| 0213585 | 9/1987 | Japan | 310/323 |
| 0247775 | 10/1987 | Japan | 310/323 |
| 0011073 | 1/1988 | Japan | 310/323 |

Primary Examiner—Mark O. Budd
Attorney, Agent, or Firm—Shapiro and Shapiro

[57] ABSTRACT

An ultrasonic motor incomprises a stator including a piezoelectric element and an elastic body capable of producing progressive vibration waves on its drive surface by excitation of the piezoelectric element, and a rotor which is driven by the progressive vibration waves produced and which includes a rotor base member and a slider member bonded to the rotor base member and brought into contact with the drive surface of the elastic body by being pressed against the same. The area of the contact portion of the slider member brought into contact with the elastic body is reduced in comparison with the area of the bonding portion of the slider member bonded to the rotor base member, thereby improving the driving efficiency.

8 Claims, 7 Drawing Sheets

ULTRASONIC MOTOR IMPROVED IN DRIVING EFFICIENCY

This is a continuation of application Ser. No. 515,714 filed Apr. 27, 1990, now abandoned.

BACKGROUND OF THE INVENTION

1. Field of the Invention

This invention relates to an ultrasonic motor in which progressive vibration waves are generated in a stator (fixed element) to drive a rotor (moving element) and which therefore has an improved in driving efficiency. That is, the present invention relates to an ultrasonic motor in which traveling vibration waves are generated in an elastic body by excitation of a piezoelectric element at a vibration frequency in an ultrasonic range to drive a rotor which is maintained in contact with the elastic body by being pressed against the same.

2. Related Background Art

Figure 11:
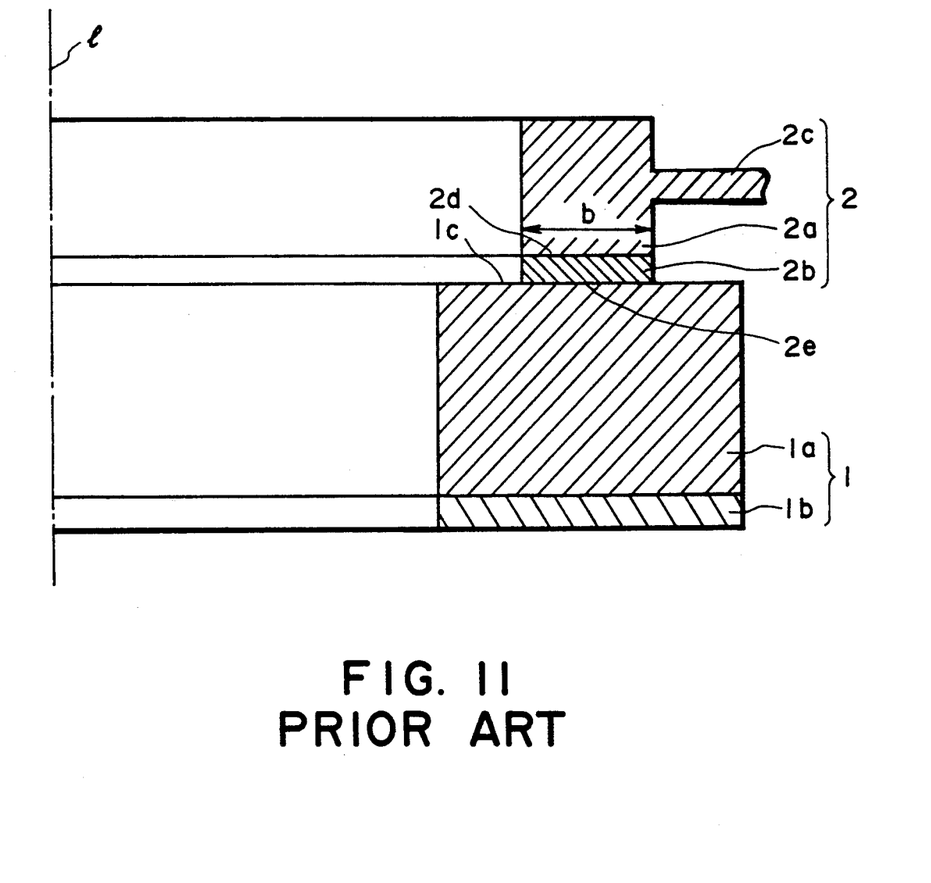
FIG. 11 is a cross-sectional view of a conventional ultrasonic motor, showing contact portions of the stator and the rotor.

Known ultrasonic motors have a type of structure such as the one disclosed in U.S. Pat. No. 4,743,788. FIG. 11 is a cross-sectional view of portions of a circular ring ultrasonic motor having such a structure.

A stator (fixed element) 1 has a ring-like elastic body 1a and a ring-like piezoelectric element 1b integrally bonded together. A rotor (moving element) 2 has a rotor base member 2a and a slider member 2b integrally bonded together. The rotor base member 2a has a flange 2c radially projecting from its portion in the vicinity of a neutral plane. A support (not shown) is formed integrally with the flange at an outer peripheral end of the same. A pressing force applied from a pressing member (not shown) is transmitted to the rotor 2 through the support to press the rotor 2 so that a lower surface (contact surface) of the slider member 2b contacts a drive surface 1c of the elastic body 1a. The slider member 2b, which is provided to improve the efficiency of driving of the rotor 2, is formed of a material having a large friction coefficient and high wear resistance.

In this construction, when an alternating current voltage is applied to the piezoelectric element 1b, the piezoelectric element 1b vibrates in a flexing manner to cause progressive vibration waves in the elastic body 1b in the circumferential direction, and the rotor 2 is driven by these vibration waves in a friction driving manner.

In this construction, however, the width b of the bonding surface 2d of the slider member 2b in the radial direction must be larger than a certain value because it is necessary to provide a bonding area between the slider member 2b and the rotor base member 2a large enough to prevent the slider member 2b and the rotor base member 2a from separating from each other during driving of the rotor 2. In the conventional ultrasonic motor, therefore, the width b of the bonding surface is selected to obtain a sufficient bonding strength. Accordingly, a contact surface 2e of the slider member 2b in contact with the elastic body 1a has a comparatively large width corresponding to the width b. The conventional ultrasonic motor therefore entails a drawback described below.

The amplitude, the wavelength and the circumferential speed of progressive vibration waves generated on the driving surface 1c of the elastic body 1a are dependent upon the distance from a center axis 1 of the rotor 2 corresponding to the center of rotation thereof, and the frictional driving force received by the slider member 2b from the elastic body 1a changes with respect to the radial position around the rotational center axis 1. In a case where the radial width of the contact surface of the slider member in contact with the elastic member is large, as in the case of the conventional motor, the degree of non-uniformity of the frictional driving force between the inner and outer circumferential ends of the slider member 2b is substantially large, so that the slider member 2b and the elastic member 1a relatively slide on each other. The efficiency of driving of the ultrasonic motor is reduced by friction losses caused by this sliding.

A linear ultrasonic motor also entails a similar drawback. That is, if the width of a contact surface of a moving element in contact with a fixed element (size in the direction perpendicular to the direction in which progressive vibration waves travel) is large, frictional losses occur at different positions because of the non-uniformity of the frictional driving force distribution in the widthwise direction of the contact surface owing to the differences between contact states of the contact surface portions and non-uniformity of pressing force.

SUMMARY OF THE INVENTION

The present invention aims to solve the above-described drawbacks, and an object of the present invention is to improve the efficiency of driving an ultrasonic motor by minimizing the non-uniformity of the frictional driving force received by the contact surface of the rotor slider member (moving element) in contact with the elastic body in the direction perpendicular to the direction of advancement of progressive vibration waves while maintaining a sufficiently large strength of bonding between the slider member and the rotor base member.

Figure 1:
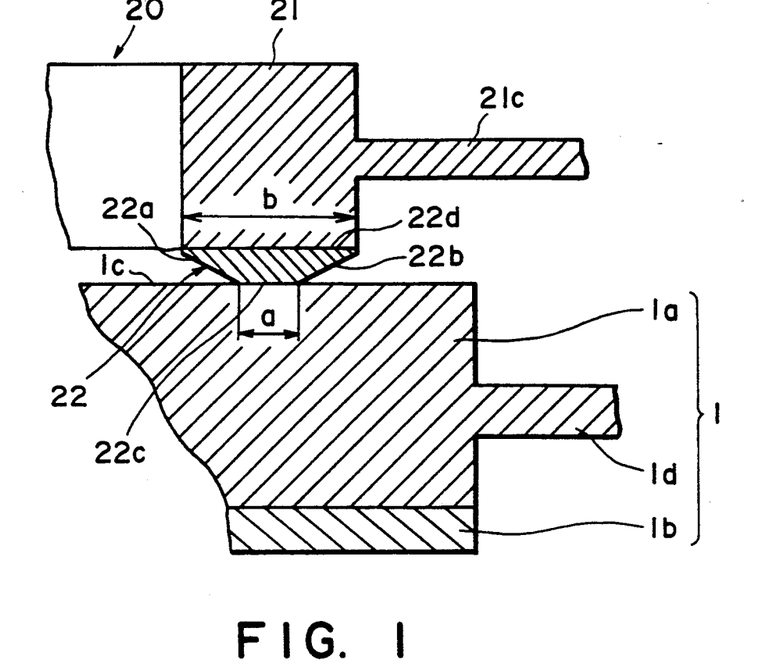
FIG. 1 is a cross-sectional view of an ultrasonic motor which represents an embodiment of the present invention, showing contact portions of the stator and the rotor.

Referring to FIG. 1 relating to an embodiment of the present invention, the present invention is applied to an ultrasonic motor including a fixed element 1 having a piezoelectric element 1b and an elastic body 1a capable of producing progressive vibration waves by excitation of the piezoelectric element 1b, and a moving element 20 which is brought into contact with the elastic body 1a by being pressed against the same through a contact surface 22c of a slider member 22 contacting the elastic body 1a. The width a of the slider member 22 at the contact surface 22c in the direction perpendicular to the direction of advancement of the progressive vibration waves is reduced in comparison with the width b of the rotor base member 21 defined in the same direction as the width a, that is, the area of the contact surface 22c is reduced, thereby achieving the object of the present invention.

Since the width a of the contact surface 22c of the slider member 22 to be brought into contact with the elastic body 1a, i.e., the width in the direction perpendicular to the direction of advancement of the progressive vibration waves is smaller than the width b of the rotor base member defined in the same direction as the width a, the non-uniformity of the frictional driving force between the inner and outer circumferential edges of the contact surface 22c of the slider member 22 in contact with elastic body 1a exhibited when the moving element 20 is driven is negligibly small while a sufficient strength of bonding between the slider member 22 and the rotor base member 21 is maintained. The reduction in the efficiency of driving the ultrasonic motor owing to the slippage between the slider member 22 and the elastic body 1a is thereby minimized.

The term "rotor" as used in this specification includes various types of moving elements other than the rotor of circular ultrasonic motors, e.g., the moving element of a disk type ultrasonic motor or a linear ultrasonic, motor. Similarly, the term "rotor base member" as used herein contemplates various other configurations of the base member as may be suitable to a particular rotor (movable member).

The above and other objects and features of the present invention will become clear upon reading the following detailed description of embodiments of the present invention taken in conjunction with the accompanying drawings.

DESCRIPTION OF THE PREFERRED EMBODIMENTS

A circular ultrasonic motor of a rotary type which represents an embodiment of the present invention will be described below with reference to FIGS. 1 to 3. The components corresponding to those shown in FIG. 11 are indicated by the same reference characters.

A stator (fixed element) 1 has a ring-like elastic body 1a formed of phosphor bronze, stainless steel or invar, and a piezoelectric element 1b in the form of a ring is integrally bonded to the elastic body 1a. The stator 1 has a flange 1d radially projecting from its portion in the vicinity of a neutral plane. The flange 1d is bonded to an upper surface of an annular support member 3 which is pinched at its outer circumferential end between a stationary cylinder 5 and a retaining ring 4 screwed in the stationary cylinder 5.

A rotor (moving element) 20 has a ring-like rotor base member 21 and a ring-like slider member 22 integrally bonded together. The rotor 20 is disposed inside the stationary cylinder 5. The rotor base member 21 has a flange 21c radially projecting from its portion in the vicinity of a neutral plane. A support 30 is formed integrally with the flange at an outer peripheral end of the same. A pressing force applied from a pressing member 6 is transmitted to the support 30, i.e., to the rotor 20 through a ball bearing 8 to press the rotor 20 so that a lower surface 22c of the slider member 22 (a surface contacting the elastic body 1a) contacts a drive surface 1c of the elastic body 1a. The ball bearing 8 consists of a retaining ring 8a and rigid balls 8b.

As shown in FIG. 1, surfaces 22a and 22b are formed on the slider member 22 on the inner and outer circumferential sides of the same by working with a lathe, so that the radial width a of the contact surface 22c of the slider member 22 in contact with the elastic body 1a, i.e., the width in the direction perpendicular to the direction of advancement of progressive vibration waves is smaller than the width b of a bonding surface 22d of the slide member 22 bonded to the rotor base member 21.

The operation of this embodiment will be described below.

When an alternating current voltage is applied to the piezoelectric element 1b, the piezoelectric element 1b vibrates in a flexing manner to cause progressive vibration waves on the drive surface 1c of the elastic body 1a. The rotor 20 is driven by these vibration waves. At this time, since the width a of the contact surface 22c of the slider member 22 to be brought into contact with the elastic body 1a is reduced in comparison with the conventional construction, the distribution of the frictional driving force based on the progressive vibration waves is substantially uniform in the radial direction. Occurrence of slippage between the slider member 22 and the elastic body 1a is thereby prevented unlike the conventional ultrasonic motor. The width b of the bonding surface 22d of the slider member 22 bonded to the rotor base member 21 is the same as the conventional motor, and there is substantially no risk of the rotor base member and the slider member 22 separating from each other by the vibration waves.

In the above-described embodiment, the slider member 22 is worked with a lathe. However, the slider member in accordance with the present invention can also be worked by lapping (polishing). FIGS. 4A to 6A show example of lapping of the slider member.

Figure 4A:
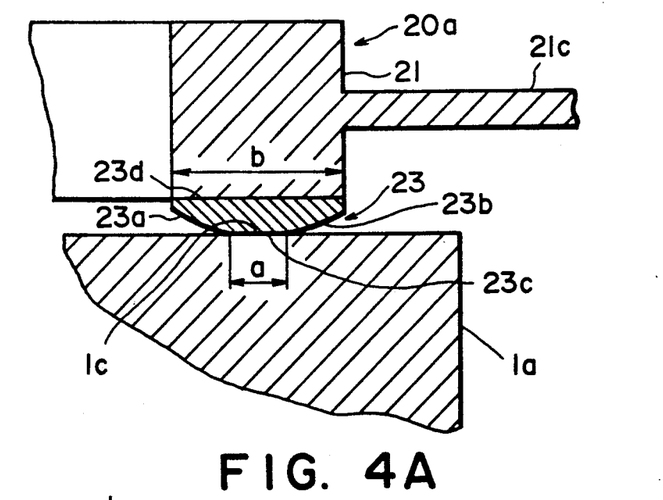
FIG. 4A is a cross-sectional view of an ultrasonic motor in accordance with another embodiment of the present invention, showing contact portions of the stator and the rotor.
Figure 4B:
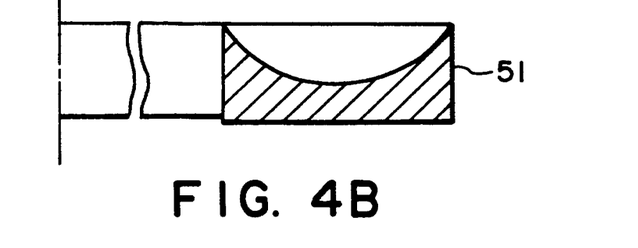
FIG. 4B is a cross-sectional view of a lapping tool.
Figure 5A:
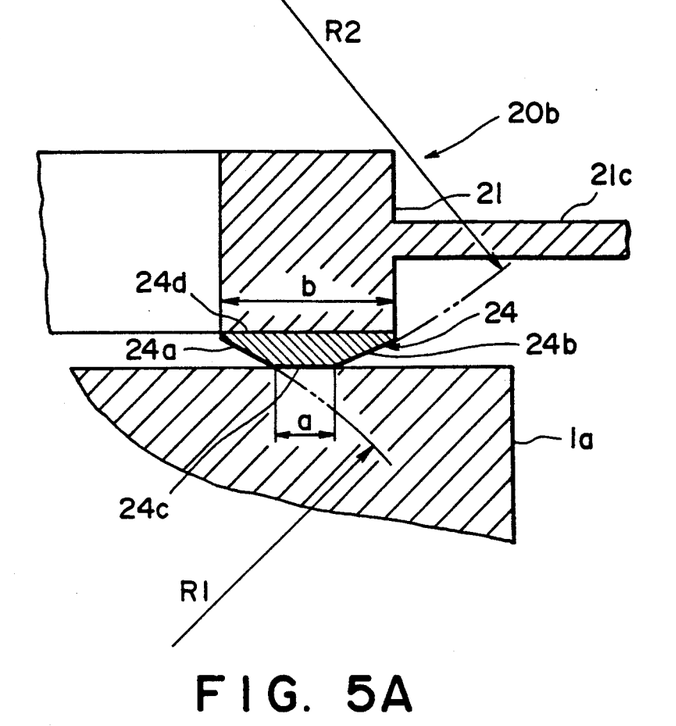
FIG. 5A is a cross-sectional view of an ultrasonic motor in accordance with a still another embodiment of the present invention, showing contact portions of the stator and the rotor.

In the example shown in FIG. 4A, a lapping tool 51 having shape such as that shown in FIG. 4B is brought into contact with a lower portion of a slider member 23 bonded to the rotor base member 21, and is moved in the circumferential direction of the slider member 23 to effect lapping. Surfaces 23a and 23b are formed on the slider member 23, so that the width a of a contact surface 23c of the slider member 23 in contact with the drive surface 1c of the elastic member 1a is smaller than the width b of a bonding surface 23d of the slider member 23 bonded to the rotor base member 21.

Figure 5B:
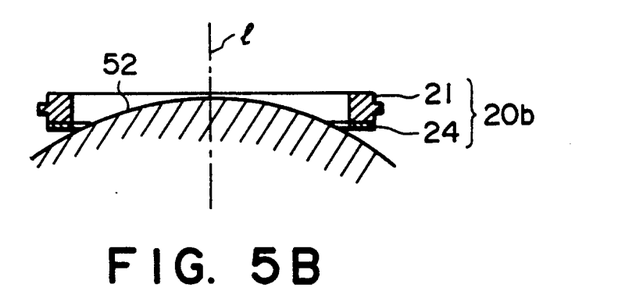
FIGS. 5B and 5C are diagrams of the methods of lapping the slider member.
Figure 5C:
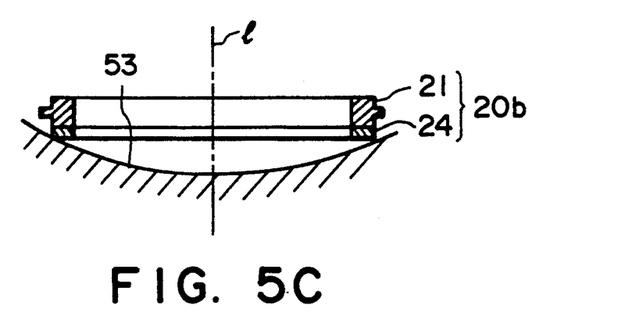

In the example shown in FIG. 5A, a slider member 24 bonded to the rotor base member 21 is first brought into contact with a lapping tool 52 having a spherical surface of a radius R1 in a manner as shown in FIG. 5B, and the rotor 20B is rotated about a rotational center axis 1 to effect lapping to form a surface 24a on the slider member 24. Next, the slider member 24 is brought into contact with a lapping tool 53 having a spherical surface of a radius R2 in a manner as shown in FIG. 5C and the rotor is rotated to form a surface 24b in the same manner. It is thereby possible to reduce the width a of a contact surface 24c of the slider member 24 to be brought into contact with the drive surface 1c of the elastic member 1a in comparison with the width b of a bonding surface 24d of the slider member 24 bonded to the rotor base member 21.

Figure 6A:
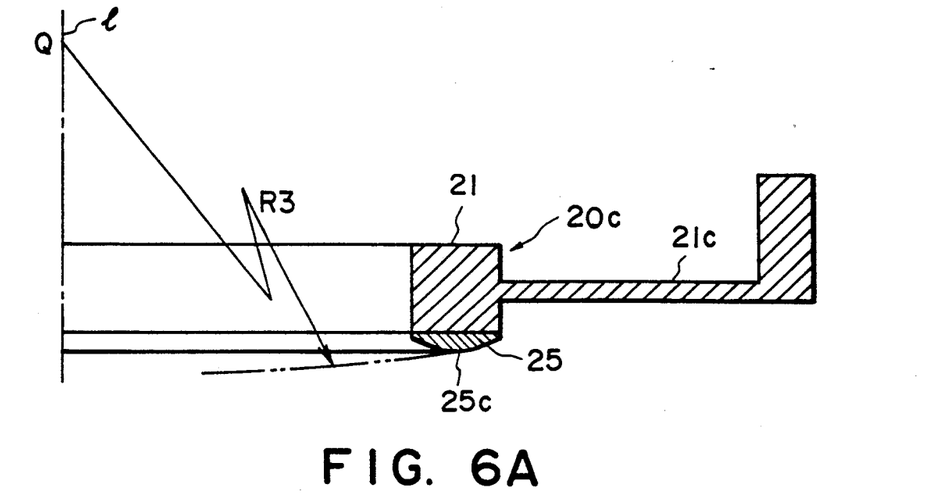
FIG. 6A is a cross-sectional view of an ultrasonic motor in accordance with a further embodiment of the present invention, showing contact portions of the stator and the rotor.

In the example shown in FIG. 6A, a contact surface 25c of a slider member 25 to be brought into contact with the elastic body 1a is formed as a spherical surface by rotating the rotor 20c in a lapping tool (not shown) having a spherical surface of a radius R3. The spherical contact surface 25c thereby formed has a radius R3 on from a point Q on the axis 1 of rotation of the rotor 20c. The effects of this contact surface are as described below.

Figure 2:
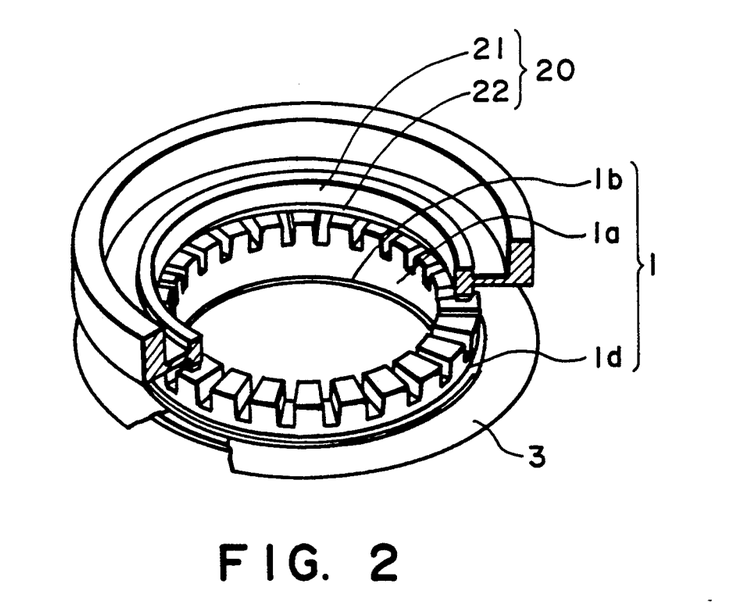
FIG. 2 is a perspective view of the overall construction of the ultrasonic motor shown in FIG. 1.
Figure 3:
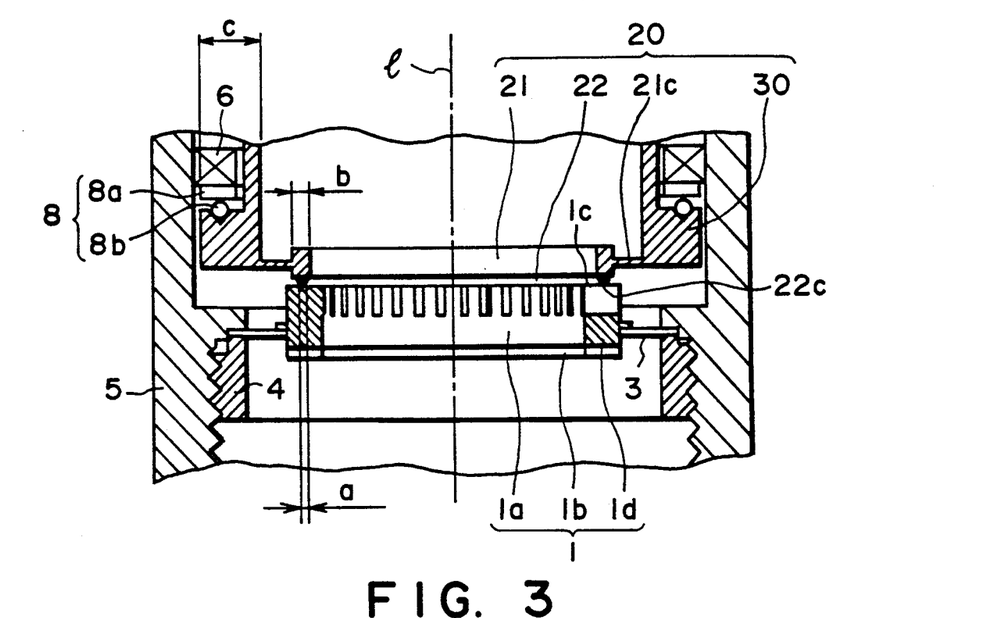
FIG. 3 is a cross-sectional view of the ultrasonic motor of FIG. 2 taken along a plane containing the rotational center axis.
Figure 6B:
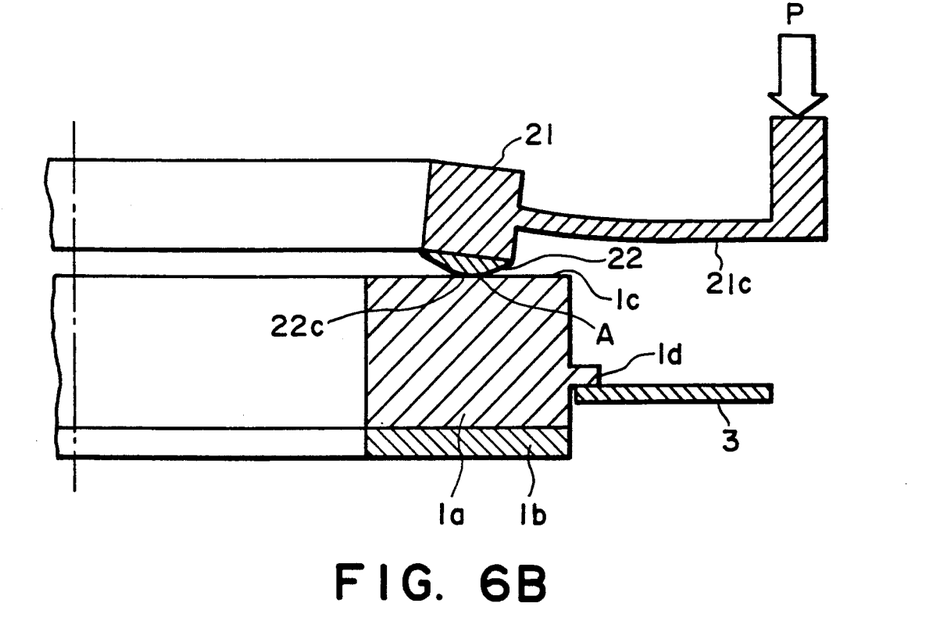
FIG. 6B is a diagram of a state in which a pressing force is applied to the rotor of the ultrasonic motor shown in FIG. 1.

In the construction of the ultrasonic motor shown in FIGS. 1 to 3, the rotor 20 pressed against the elastic body 1a by the pressing member 6 with a force P is bent in the thrusting direction, as shown in FIG. 6B. In this event, if the contact surface 22c of the slider member 22 in contact with the elastic body 1a is flat as in the case of the embodiment shown in FIG. 1, only an angular portion contacts the elastic member 1a, as shown in FIG. 6B, that is, the contact area is reduced to a line. Therefore the frictional driving force is not uniformly transmitted from the elastic body 1a to the slider member 22, thereby causing variations in the rotational speed, a difference between the normal-rotation and reverse-rotation performances and changes in the rotational speed during use for a long period of time.

Since, in the example shown in FIG. 6A, the contact surface 25c of the slider member 25 in contact with the elastic body 1a is spherical, the contact surface 25c and the drive surface 1c of the elastic body 1a actually contact each other with a substantial contact area by virtue of the pressing force, even if the rotor 20c is bent in the thrusting direction by being pressed with the elastic body 1a. In addition, the contact surface 25c can be worked with a lapping tool having a spherical surface with high working performance, thereby reducing the roughness in the worked surface as well as undulations of the same. As a result, there is substantially no possibility of the above-described undesirable condition.

In the above-described embodiments, the slider member has a cross section generally symmetrical with respect to a line perpendicular to the radial directions. However, any other shape of the slider member is possible provided that the width of the contact surface of the slider member in contact with the elastic body is smaller than the width of the bonding surface of the slider member bonded to the rotor base member. For example, while the slider member has slanted surfaces formed on the sides of the outer and inner circumferential ends of the rotor base member in the above-described embodiments, a slanted surface may be formed on the side of the inner circumferential end or the outer circumferential end of the rotor base member alone.

The embodiment shown in FIGS. 1 to 3 will be further described below with respect to details of the slider member of the rotor.

As described above with reference to FIGS. 1 to 3, the rotor 20 has the ring-like rotor base member 21 and the slider member 22 bonded to the lower surface of the rotor base member 21, and the rotor base member 21 is formed integrally with the thin flange 21c having a large elastic modulus and the ring-like rotor support 30. While the rotor base member 21 integrally formed and the slider member 22 are vibrated by progressive vibration waves of the elastic body 1a of the stator 1, the vibration of the rotor 20 does not reach the rotor support 30 because the rotor base member 21 and the rotor support 30 are connected by the flange 21c having a large elastic modulus, thereby limiting attenuation of the vibration of the rotor 20 and, hence, the reduction in motor driving efficiency.

The radial width b of the bonding surface 22d of the slider member 22 bonded to the rotor base member 21 is set to a value such as to satisfy various conditions, including a condition that the load which presses the rotor 20 against the stator 1 is supported, a condition that sufficient motor driving performance is ensured when the rotor 20 is driven by the vibration of the stator 1, a condition that the slider is bonded to the rotor base member 21 with a sufficient bonding strength, and so on. Also, the radial width a of the contact surface 22c of the slider member 22 to be brought into contact with the elastic body 1a is set to a value such as to optimize the motor driving performance. The applicant of the present invention has conducted a driving test of the ultrasonic motor by setting a plurality of combinations of values of the widths a and b of the slider member 2, and has found that the performance of driving the ultrasonic motor is improved if the area of the contact surface 22c of the slider member 22 in contact with the elastic body 1a is smaller than 70% of the area of the bonding surface 22d of the slider member 22 bonded to the rotor base member 21, that is, if the width a is smaller than 70% of the width b (a<0.7b). More concretely, the motor driving performance is good when the radial width b of the rotor base member 21 is 1.5 mm, for example, and the radial width a of the contact surface 22c of the slider member 22 in contact with the elastic body 1a is 0.9 mm (0.6b), for example.

In this embodiment, the width c of the rotor support 30 in the radial direction is larger than a width sufficient for receiving the load applied by the pressing member 6 (larger than b, e.g., 3 mm). There is no problem even if the width c is increased to such a degree that the rigidity of the rotor support 30 is substantially high, since the rotor support 30 is adapted as non-vibration portion as a mentioned above.

The slider member in accordance with this embodiment is formed of a synthetic resin composite material based on mixing glass fiber and molybdenum disulfide in polytetrafluoroethylene. If the rotor 20 is pressed against the elastic body 1a through the slider member having this composition, the wear resistance of the rotor can be greatly improved and the friction performance based on the dynamic friction coefficient and so on can be stabilized. Moreover, it is possible to avoid the problem of the contact surfaces of the stator and the slider member being fixed to each other to make the motor unable to rotate, which problem may be encountered if the motor is left for long a time with the stator and the rotor pressed against each other. Thus, the ultrasonic motor can be improved in life as well as in the stability of driving characteristics.

Table 1 shows the thicknesses and the elastic module of the rotor base member 21 and the slider member 22.

TABLE 1

|  | Thickness (mm) | Elastic modulus (Kgf/mm$^2$) |
|---|---|---|
| Rotor base member | 2.0 | 7300 |
| Slider member | 0.3 | 870 |

Accordingly, the flexural rigidity of the slider member 22 is about 1/2500 of that of the rotor base member 21. Consequently, although the slider member 22 is integrally bonded to the rotor base member 21, the attenuation of the vibration of the rotor base 21 owing to the slider member is completely negligible, and there is substantially no bad influence upon the motor driving performance.

FIGS. 7 to 10 show examples of modifications relating to the slider member.

Figure 7:
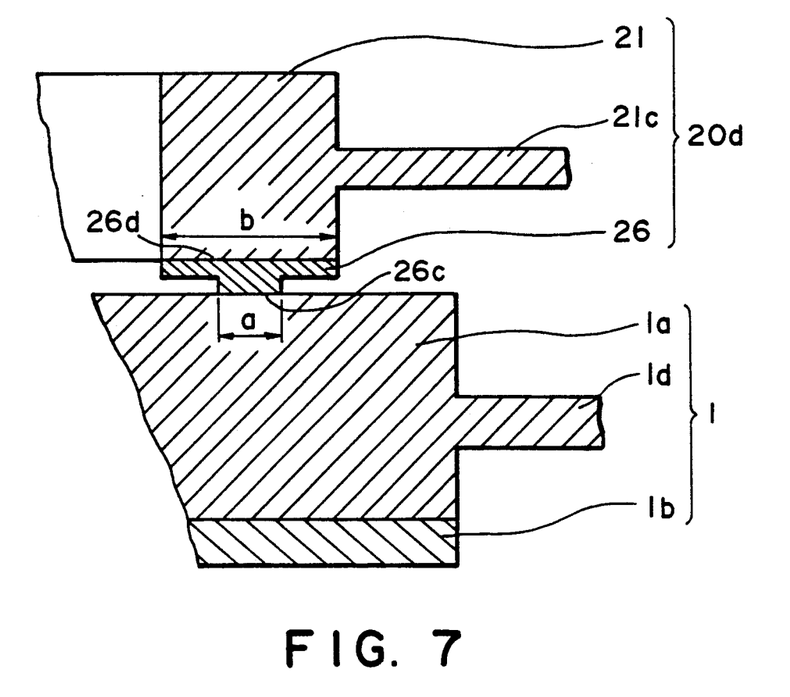
FIGS. 7 to 10 are cross-sectional views of ultrasonic motors in accordance with still further embodiments of the present invention, showing contact portions of the stators and the rotors.

In the example shown in FIG. 7, a stepped slider member 26 is used which has a bonding surface 26d having a width b and bonded to the rotor base member 21, and a contact surface 26c having a width a and contacting the elastic body 1a of the stator 1.

Figure 8:
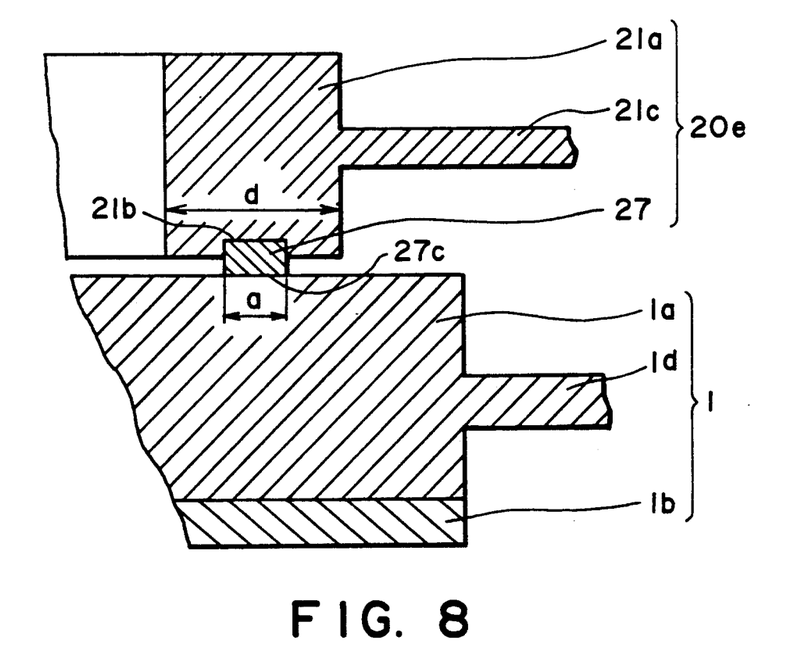

In the example shown in FIG. 8, a rotor base member 21a has an annular recess 21b formed in its lower surface, and a slider member 27 having a width a is retained by being fitted in this recess.

Figure 9:
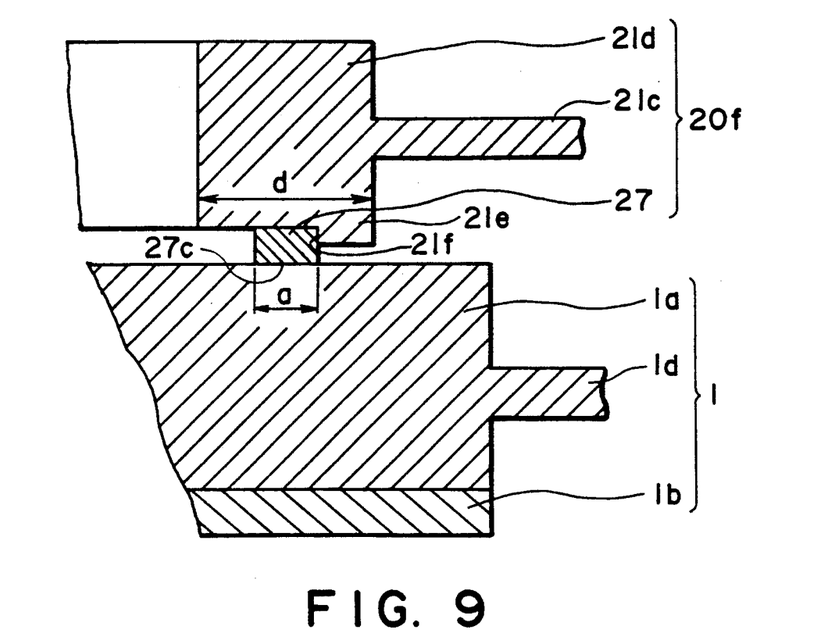

In the example shown in FIG. 9, a rotor base member 21d has a projecting portion 21e formed on its lower surface at its outer end, and the slider member 27 is fitted to the rotor base member in such a manner that the outer circumferential surface of the slider member 27 is supported by an inner circumferential surface 21f of the projecting portion 21e.

Figure 10:
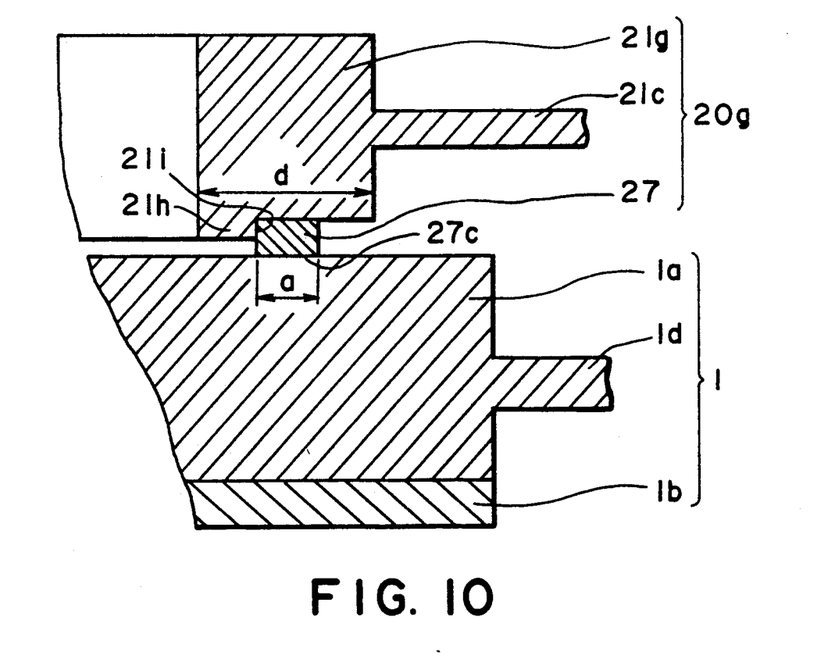

In the example shown in FIG. 10, a rotor base member 21g has a projecting portion 21h formed on its lower surface at its inner end, and the slider member 27 is fitted to the rotor base member in such a manner that the inner circumferential surface of the slider member 27 is supported by an outer circumferential surface 21i of the projecting portion 21h.

In accordance with the embodiments shown in FIGS. 8 to 10, the area of the contact surface 27c of the slider member 27 to be brought into contact with the elastic body 1a is reduced in comparison with that of the bonding surface bonded to the rotor base member 21a, 21d or 21g to achieve the object of the present invention.

The present invention is described above with respect to the type of ultrasonic motor having a rotor in the form of a circular ring. However, the present invention is not limited to the rotary type ultrasonic motor and can be applied to linear ultrasonic motors.

In accordance with the present invention, the area of the contact surface of the slider member to be brought into contact with the elastic body is smaller than the area of the bonding surface of the slider member bonded to the rotor base member, thereby ensuring that the non-uniformity of the frictional driving force received from the elastic body by the contact surface of the slider member in contact with the elastic member and exhibited in the radial direction can be made negligibly small. It is therefore possible to limit relative slippage between the slider member and the elastic body and, hence, the reduction in the efficiency of driving the ultrasonic motor owing to this slippage.

For a linear ultrasonic motor also, the present invention makes it possible to reduce the non-uniformity of the frictional driving force and to thereby limit the friction losses at different portions of the drive surface.

It is to be understood, of course, that the specific embodiments disclosed herein are merely exemplary of the present invention. As will be readily apparent to those skilled in the art, a wide variety of implementations is possible in keeping with the spirit and principles of the invention, the scope of which is defined in the appended claims.

We claim:

1. An ultrasonic motor comprising:
a stator having a piezoelectric element and an elastic body capable of producing a traveling vibration wave on a drive surface thereof with excitation of said piezoelectric element, said drive surface being formed on a plane perpendicular to a rotating axis; and a rotor rotatable about said rotating axis by said traveling vibration wave, said rotor having a slider member with a continuous annular contact surface that is brought into contact with the drive surface of said elastic body by being pressed against said drive surface, and a rotor base member bonded to said slider member;

wherein the area of said contact surface is smaller than the area of said slider member at which said slider member is bonded to said rotor base member; and wherein said rotor base member has an annular recess formed in a surface opposed to said drive surface, and said slider member is retained by being fitted in said recess.

2. An ultrasonic motor comprising:
a stator having a piezoelectric element and an elastic body capable of producing a traveling vibration wave on a drive surface thereof with excitation of said piezoelectric element, said drive surface being formed on a plane perpendicular to a rotating axis; and a rotor rotatable about said rotating axis by said traveling vibration wave, said rotor having a slider member with a continuous annular contact surface that is brought into contact with the drive surface of said elastic body by being pressed against said drive surface, and a rotor base member bonded to said slider member;

wherein the area of said contact surface is smaller than the area of said slider member at which said slider member is bonded to said rotor base member; and wherein said rotor base member has an annular projecting portion formed on a surface opposed to said drive surface, and said slider member is fitted to said rotor base member in such a manner that a radially inner or outer circumferential surface of said slider member is supported by a circumferential surface of said annular projecting portion.

3. An ultrasonic motor comprising:
a stator having a piezoelectric element and an elastic body capable of producing a traveling vibration wave on a drive surface thereof with excitation of said piezoelectric element; and a moving member driven along a path of movement of said traveling vibration wave by said traveling vibration wave, said moving member having a base member and a slider member bonded to said base member;

said drive surface of said elastic body being formed in a plane perpendicular to a plane defined by said path of movement and a directing perpendicular to said path of movement;

said slider member having a continuous contact surface elongated in a plane parallel to the plane of said drive surface and pressed into contact with said drive surface;

the area of said contact surface being smaller than the area of said slider member at which said slider member is bonded to said base member; and wherein said base member has a recess formed in a surface opposed to said drive surface, and said slider member is retained by being fitted in said recess.

4. An ultrasonic motor comprising:

a stator having a piezoelectric element and an elastic body capable of producing a traveling vibration wave on a drive surface thereof with excitation of said piezoelectric element; and a moving member driven along a path of movement of said traveling vibration wave by said traveling vibration wave, said moving member having a base member and a slider member bonded to said base member;

said drive surface of said elastic body being formed in a plane perpendicular to a plane defined by said path of movement and a direction perpendicular to said path of movement;

said slider member having a continuous contact surface elongated in a plane parallel to the plane of said drive surface and pressed into contact with said drive surface;

the area of said contact surface being smaller than the area of said slider member at which said slider member is bonded to said base member; and wherein said base member has a projecting portion formed on a surface opposed to said drive surface and said slider member is fitted to said base member in such a manner that a lateral end surface of said slider member is supported by a lateral end surface of said projecting portion.

5. An ultrasonic motor comprising:

a stator having a piezoelectric element and an elastic body capable of producing a traveling vibration wave on a drive surface thereof with excitation of said piezoelectric element; and a rotor rotatable about a rotating axis by said traveling vibration wave, said rotor having a slider member with a continuous annular contact surface that is brought into contact with the drive surface of said elastic body by being pressed against said drive surface, and a rotor base member bonded to said slider member;

wherein the area of said contact surface is smaller than the area of said slider member at which said slider member is boned to said rotor base member; and wherein said rotor base member has an annular recess formed in a surface opposed to said drive surface, and said slider member is retained by being fitted in said recess.

6. An ultrasonic motor comprising:

a stator having a piezoelectric element and an elastic body capable of producing a traveling vibration wave on a drive surface thereto with excitation of said piezoelectric element; and a rotor rotatable about a rotating axis by said traveling vibration wave, said rotor having a slider member with a continuous annular contact surface that is brought into contact with the drive surface of said elastic body by being pressed against said drive surface, and a rotor base member bonded to said slider member;

wherein the area of is contact surface is smaller that the area of said slider member at which said slider member is bonded to said rotor base member; and wherein said rotor base member has an annular projecting portion formed on a surface opposed to said drive surface, and said slider member is fitted to said rotor base member in such a manner that a radially inner or outer circumferential surface of said slider member is supported by a circumferential surface of said annular projecting portion.

7. An ultrasonic motor comprising:

a stator having a piezoelectric element and an elastic body capable of producing a traveling vibration wave on a drive surface thereof with excitation of said piezoelectric element; and a moving member driven along a path of movement of said traveling vibration wave by said traveling vibration wave, said moving member having a base member and a slider member bonded to said base member;

said slider member having a continuous contact surface elongated in a plane parallel to said drive surface and pressed into contact with said drive surface;

the area of said contact surface being smaller than the area of said slider member at which said slider member is bonded to said base member; and wherein said base member has a recess formed in a surface opposed to said drive surface, and said slider member is retained by being fitted in said recess.

8. An ultrasonic motor comprising:

a stator having a piezoelectric element and an elastic body capable of producing a traveling vibration wave on a drive surface thereof with excitation of said piezoelectric element; and a moving member driven along a path of movement of said traveling vibration wave by said traveling vibration wave, said moving member having a base member and a slider member bonded to said base member;

said slider member having a continuous contact surface elongated in a plane parallel to said drive surface and pressed into contact with said drive surface;

the area of said contact surface being smaller than the are of said slider member at which said slider member is bonded to said base member; and wherein said base member has a projecting portion formed on a surface opposed to said drive surface, and said slider member is fitted to said base member in such a manner that a lateral end surface of said slider member is supported by a lateral end surface of said projecting portion.

* * * * *